(12) United States Patent
Evans (10) Patent No.: US 8,401,860 B1
(45) Date of Patent: Mar. 19, 2013

(54) VOICE-ACTIVATED COMMAND AND CONTROL FOR REMOTELY CONTROLLED MODEL VEHICLES

(76) Inventor: Paul R Evans, Big Rock, IL (US)

( * ) Notice: Subject to any disclaimer, the term of this patent is extended or adjusted under 35 U.S.C. 154(b) by 912 days.

(21) Appl. No.: 11/123,626

(22) Filed: May 6, 2005

(51) Int. Cl.
*G10L 15/265* (2006.01)
(52) U.S. Cl. ............... 704/275; 704/225; 701/9; 701/3; 701/2; 701/16; 701/1; 398/129; 342/129; 341/176; 340/995.14; 340/945
(58) Field of Classification Search ............... 704/275, 704/225; 381/172; 341/176; 701/9, 3, 2, 701/16, 1; 398/129; 342/29; 340/995.14, 340/945
See application file for complete search history.

(56) References Cited

U.S. PATENT DOCUMENTS

| | | | | |
|---|---|---|---|---|
| 4,725,956 A * | 2/1988 | Jenkins | ............................. | 701/2 |
| 4,739,311 A * | 4/1988 | Yamamoto et al. | ............ | 341/176 |
| 4,929,949 A * | 5/1990 | Yamamoto et al. | ............ | 341/176 |
| 5,077,671 A * | 12/1991 | Leslie et al. | ....................... | 701/3 |
| 5,323,257 A * | 6/1994 | Abe et al. | ....................... | 398/129 |
| 5,751,237 A * | 5/1998 | Tanaka | ........................... | 341/176 |
| 5,774,841 A * | 6/1998 | Salazar et al. | ................. | 704/225 |
| 6,230,136 B1 * | 5/2001 | Yamamoto et al. | ........... | 704/275 |
| 6,262,679 B1 * | 7/2001 | Tran | ................................ | 342/29 |
| 7,221,290 B2 * | 5/2007 | Burgemeister | ................ | 340/945 |
| 7,840,317 B2 * | 11/2010 | Matos et al. | ..................... | 701/16 |
| 2003/0093187 A1 * | 5/2003 | Walker | ................................ | 701/1 |
| 2004/0102876 A1 * | 5/2004 | Doane | ................................ | 701/9 |
| 2005/0195096 A1 * | 9/2005 | Ward et al. | ................ | 340/995.14 |

* cited by examiner

*Primary Examiner* — Michael Colucci
(74) *Attorney, Agent, or Firm* — Cleere IP Law Office LLC; Scott R. Cleere (57) ABSTRACT

A voice-activated command and control system for remotely-controlled vehicles includes a voice-activated control module, a microphone, and a verbal or visual feedback indicator such as a speaker. The operator speaks instructions into the microphone to activate control functions on the vehicle. Confirmation of receipt and/or status of the verbally commanded instructions are sent back to the operator such as spoken through the speaker. The microphone and speaker can be implemented, for example, either in a headset (with a microphone and earphones) worn by the operator, or in the hand-held controller for the vehicle. The system can be alternately implemented without the speaker or other feedback element.

20 Claims, 8 Drawing Sheets

VOICE-ACTIVATED COMMAND AND CONTROL FOR REMOTELY CONTROLLED MODEL VEHICLES

CROSS-REFERENCES TO RELATED APPLICATIONS

None.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to flight controls for remotely controlled vehicles.

More particularly, the invention relates to, preferably two-way, voice-activated command and control for radio-controlled (R/C) vehicles, as well as for control of virtual or simulated remotely-controlled vehicles such as utilized in a vehicle control simulator.

2. Background Art

Ownership and operation of R/C model vehicles has increased over the past few decades. It is now a hobby enjoyed by many adults, as well as younger people.

The following is a brief description and example of a typical control scenario for piloting a conventional R/C model airplane, variations on this description are available in the art. Pilot controls consist of a hand-held controller with various modules including an electrical, electronic or micro-processor-based control function, a radio frequency transmitter function, and a radio frequency receiver function. The controller is commonly configured to be held in both of (between) the user's hands, and contains two (left and right) flight control levers (commonly referred to as "joysticks") that can be manually actuated (pivoted) in at least two orthogonal directions. These levers commonly control the basic flight control functions of the airplane. The pilot using his or her right-hand fingers (or right-hand thumb) moves the right control lever left or right for proportional movement of the airplane's ailerons (banking control) and up and down for proportional movement of elevator (pitch control). The pilot's left hand fingers (or left hand thumb) moves the left control lever left to right for proportional movement of rudder (yaw control) and up and down for proportional movement of engine throttle (engine speed or vehicle velocity control). Collectively, these controls are generally to referred to herein as aircraft "trim" controls. All other controls (the "auxiliary" controls) for the aircraft, such as raising and lowering of retractable landing gear and flaps, electronically changing the proportional rate of aircraft "trim" controls and the linear to exponential rate of aircraft "trim" controls (dual-rate controls), applying landing gear wheel brakes, applying air brakes, shutting off the engine, opening and closing boom doors, etc., are commonly triggered with a variety of mechanical switches and equivalent manually-operable devices mounted on the hand-held controller. Common switch types used for these purposes include push button, rotary, toggle, and slide switches. The pilot actuates these switches with his or her fingers as well as, and sometimes simultaneously with actuation of the aircraft "trim" controls. Thus, proper control of R/C aircraft 20 requires a developed level and combination of manual dexterity, manual response times, and visual line-of-sight with the vehicle.

Problems in control of R/C aircraft can arise in a number of circumstances. For example, any need to take your eyes off of the aircraft while flying under control even for a moment many times causes a problem upon trying to regain a visual on it in the air. When the pilot looks back up in the sky for the aircraft, the aircraft's anticipated position is not always where its true position is. By the time the pilot finds the aircraft position by sight and determines its current attitude in the air and responds with the corrective control adjustments to regain controlled flight the aircraft many have crashed.

One of the more difficult aspects of flying R/C aircraft under control involves controlling an aircraft at low altitude flight. The reaction times with administering changes to aircraft "trim" controls are very minimal to overt crash landings. So any loss of the pilot's line of sight to the aircraft as well as allowing his or her fingers and or thumbs to break contact with the aircraft "trim" controls are conditions which will frequently lead to crashes.

As both the field and the users have matured during the past number of years, the market has responded and model R/C vehicles have become more realistic, more complicated, larger sized, and more expensive. The danger of practicing on this expensive equipment is the risk of loss if the vehicle crashes.

Simulation software is available to simulate the operation and control of R/C vehicles. This software assists the novice in acquiring the needed skills without the danger of crashing and destroying a potentially expensive vehicle, and to assist the experienced person in keeping and honing control skills when not in the field. Although available, not all novice users will utilize this software to acquire the necessary skills to become proficient in controlling R/C vehicles.

Thus, there is a need for improved control of R/C vehicles, including during simulation and training in the control of such vehicles.

SUMMARY OF THE INVENTION

The general objective of the invention is to provide new and unique control of remotely controlled vehicles, including virtual or simulated vehicles such as utilized in a vehicle control simulator.

Another objective of the invention is to provide such new and unique control for R/C vehicles, including during simulation and training in the control of R/C vehicles.

A detailed objective of the invention is to achieve the foregoing with new and unique, preferably two-way, voice-activated command and control for remotely controlled vehicles, including for R/C vehicles, and virtual or simulated vehicles.

These and other objectives and advantages of the invention will become more apparent from the following detailed description when taken in conjunction with the accompanying drawings.

A preferred embodiment, two-way voice-activated command and control system in accordance with the invention, when applied in piloting a model airplane, provides for administration of airplane control functions with an integrated voice-activated control and feedback indicator unit. This unit can be, for example, a headset worn by the "pilot" (i.e., the vehicle operator) that includes a microphone and earphones, or a microphone and speaker implemented in an alternate unit that is convenient for operator interaction such as in a pocket-sized unit or a belt clip-on unit or built into the conventional hand-held controller for the vehicle. The two-way voice-activated unit (generally referred to herein as a "headset") allows the pilot, using his or her voice, to speak words into the microphone to voice activate the various control functions to the airplane (or other remotely-controlled vehicle). The speaker (generally referred to herein as the "earphones") is used to provide verbal feedback, i.e., voice recognition in verbal words, back to the pilot's ears from the airplane to confirm receipt, status and/or completion of the previous administered control functions, enunciation of alarms, and various operational and/or environmental data via the airplane's on-board data storage system. The headset is used in coordination with the conventional (e.g., levers, switches, buttons, etc.) aircraft trim controls and auxiliary controls of the hand-held transmitter/receiver controller to enact various control functions which can be administered simultaneously from the pilot and at his or hers discretion. The aircraft trim and auxiliary control movement applied to the hand-held controller, the words spoken into the microphone by the pilot, and the words the pilot hears through the earphones from the airplane's on-board transmitter/receiver controller are electronically converted by the hand-held controller and sent or received back and fourth from the airplane via radio waves. The airplane's on-board controller transmits and receives controlling information and data information via radio waves back and fourth from the hand-held controller and converts this radio wave information electronically to control motorized actuators (servos) linked to the airplane's controls such as ailerons, elevator, rudder, throttle, flaps, landing gear, doors, etc. The two-way voice activated command and control system also controls the transfer of data captured nom the airplane's on-board telemetry data system. The airplane's on-board telemetry system is an electronic device that stores data that is obtained from various types of electronic sensors attached to it. These sensors are mounted about the airplane. Some sensor examples include a sensor in the engine's exhaust flow to sense temperature level, an accelerometer sensor on-board to sense "g" forces applied to airplane's structure, etc. To operate and or fly the R/C model airplane under control, the pilot using his or her eyes must visually see the airplane and apply control commands via the hand-held controller and headset.

Using one example of a control being initiated by the pilot to the airplane and the flow of operational interface in carrying out the command with the two-way voice activated command and control system in controlling the airplane's flaps is as follows: The pilot speaks the words "flaps thirty" into the headset's microphone and the microphone converts these words into a electronic signal. This command signal is sent to the hand-held controller where the signal is matched by a prior programmed microprocessor which triggers the control action to the flap control interface then is transmitted to the on-board controller via radio waves. Here the signal is received and converted to operate the controlling servo linked to the flaps and the flaps move down to a thirty-degree position. After the electronic task is completed a prior microprocessor voice programmed confirmation message is sent back to the headset's earphones by the on-board controller via radio waves to the hand-held controller and is converted to an audio sound by the earphones and is heard by the pilot's ear. The confirmation message could include these words "copy flaps thirty", a busier sound, etc. The command and confirmation, prior electrically microprocessor stored words, can be any words the pilot and or the microprocessor programmer elect.

The above electronic interface routing can vary, depending upon the electrical hardware's physical location. Using the two-way voice activated command and control system allows the pilot to have a "virtual reality like" communication between him or her-self and the airplane using his or her speaking voice and hearing capabilities. Two benefits when using the two-way voice activated command and control system are as follows: (i) allowing multiple control functions to be administered simultaneously by the pilot without moving his or her fingers off the aircraft "trim" controls which control the basic flight controls discussed above, and (ii) allowing the pilot to keep his or her eyes looking at the airplane instead of taking them off the airplane momentarily to look for a control switch to activate by his or her fingers or displayed data on the hand-held controller while in operation of the airplane.

The two-way voice activated command and control system can be used to operate a simulated model airplane that is produced within a flight simulator, as well as for selection or control the operational or environmental parameters of the simulator.

The voice activated command and control system of the invention can alternately be implemented with a one-way communication from the operator for control of the vehicle.

A basic voice-activated command and control system in accordance with the invention is configured for use with a remotely controlled vehicle of the type having an on-board controller to (a) receive control function signals by wireless transmission and (b) control the corresponding control functions on the vehicle. In this instance, the voice-activated command and control system includes (a) a microphone for receiving a verbal command; and (b) a voice-activated control module for transmitting a control function signal responsive to a verbal command received by the microphone to the vehicle by wireless transmission; wherein the microphone and control module allow an operator, using his or her voice, to speak a word command into the microphone to voice activate and remotely control the control functions of the vehicle.

A two-way voice-activated command and control system in accordance with the invention is configured for use with a remotely controlled vehicle of the type having an on-board controller to (a) receive control function signals by wireless transmission, (b) control the corresponding control functions on the vehicle, and (c) transmit feedback signals by return wireless transmission indicative of at least one of (i) receipt of the control function signals, (ii) status of the corresponding control functions on the vehicle, and (iii) vehicle operational or environment data. In this instance, the voice-activated command and control system includes (a) a microphone for receiving a verbal command; (b) a voice-activated control module for transmitting a control function signal responsive to a verbal command received by the microphone to the vehicle by wireless transmission; and (c) a feedback indicator responsive to feedback signals by return wireless transmission from the vehicle; wherein the microphone and control module allow an operator, using his or her voice, to speak a word command into the microphone to voice activate and remotely control the control functions of the vehicle.

The control module of the voice-activated command and control system will be programmed to recognize certain verbal commands corresponding to certain control functions of the vehicle, and distinguish between such verbal commands and other verbal commands or sound waves as may be received by the microphone. In certain preferred embodiments, the control module will distinguish applicable parts the recognized verbal commands including a descriptive part identifying the applicable control function (e.g., flaps or wheels), and a numeric part (e.g., thirty degrees) and/or a relational part (e.g., down).

The microphone of the voice-activated command and control system will be located for the convenience of the operator, such as in a pocket-sized unit or clip-on unit or a hand-held unit such as the conventional hand-held controller of the vehicle. In one preferred embodiment, the voice-activated command and control system includes a headset that carries the microphone. In certain alternate embodiments, both the microphone and the control module of the voice-activated command and control system are located together in a single unit, such as in a hand-held unit, a pocket-sized unit, a clip-on unit, or a headset.

In the two-way voice-activated command and control system, microphone and feedback indicator may be carried together in a single unit such as a pocket-sized unit, a clip-on unit, or a hand-held unit such as the conventional hand-held controller. The feedback indicator includes an audible feedback indicator and/or a visual feedback indicator responsive to the return feedback signals from the vehicle. One preferred feedback indicator includes a speaker to produce audible feedback in the form of spoken communication. A preferred implementation of this the feedback indicator is to provide a headset that carries the microphone and the speaker in the form of an earphone in a single unit worn by the user.

The voice-activated command and control system in accordance with the invention may also be implemented for cooperative vehicle control with a separate controller utilizing either parallel or a series command configuration, or a combination thereof. In such instances, the separate controller will include provision for certain control functions (designated the trim control functions for purposes hereof), with the control module of the system and the controller cooperatively transmitting (a) control function signals responsive to verbal commands received by the microphone and (b) trim control function signals, respectively, to the vehicle by wireless transmission. In the parallel command control implementation, there will be a common command set whereby the vehicle is alternately responsive to the control function signals in the common command set from the verbal commands received by the microphone and from the trim control functions independently of each other. In the series command control implementation, there will be a common command set whereby the vehicle is exclusively responsive to individual control function signals in the common command set from either a verbal command received by the microphone or a trim control function. In preferred embodiments, such cooperative implementation is effected with the conventional hand-held manual controller capable of providing manual trim control functions.

In general, a voice-activated command and control system in accordance with the invention transmits control function signals via radio waves or other applicable technologies for a wireless-controlled powered airplane, a sail plane, a boat, a helicopter, a wheeled vehicle or like remotely controlled devices. Such vehicles may be real or simulated vehicles. Thus, for simulated vehicles, the voice-activated command and control system (a) communicates with a microprocessor simulated environment for implementing the vehicle, and (b) transmits the control function signals by simulated wireless transmission to the simulated vehicle. In certain embodiments, the voice-activated command and control system is further configured to select or control operational or environmental parameters of the simulated environment responsive to additional verbal commands spoken to the microphone.

The two-way voice-activated command and control system may be further implemented in a multiplexed monitoring and/or interactive system for communications with, for example, other operators, ground personnel, observers, a microprocessor-based system in the roll of an observer or supervisor.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

This invention relates to a voice-activated, and optionally voice-enunciated, command and control for remotely controlled vehicles. For purposes of illustration, the system is generally described herein in connection with a radio-controlled (R/C) remotely-controlled vehicle, but is applicable for use with all types of real and simulated or virtual remotely-controlled vehicles. In preferred embodiments, the invention relates to two-way voice-activated, and optionally voice-enunciated, command and control for remotely controlled vehicles. The invention may also be implemented in a one-way voice-activated command and control for remotely controlled vehicles. Of the several embodiments illustrated in the drawings and described herein, a common aspect of the invention relates to voice-triggering or voice-activation of command and control functions of the R/C device, with optional voice-activated feedback indicators provided to the operator in relation to various functions of the vehicle and/or its environment.

A preferred system in accordance with the invention provides two-way voice-activated command and control between operational control and/or telemetry data systems on-board an R/C device, and its operator and/or operators (interchangeably referred to herein as the "operator"). The two-way voice system causes the data captured by a telemetry system on-board the R/C device to be transferred to the operator using the operator's speaking voice spoken through a microphone commanding or triggering the transfer. This data transfer is presented to the operator by a microprocessor-generated voice that is transmitted through a speaker or through earphones worn over the operator's ears. Control of this two-way R/C system is to enable the operator to use his or her voice speaking through a microphone to command or trigger a R/C device's on-board control systems to effect response and control of various control functions in real time to the R/C device. Another use of the system is to allow the operator to command or trigger as described herein to a simulated R/C device through the use of a R/C simulator.

Figure 1:
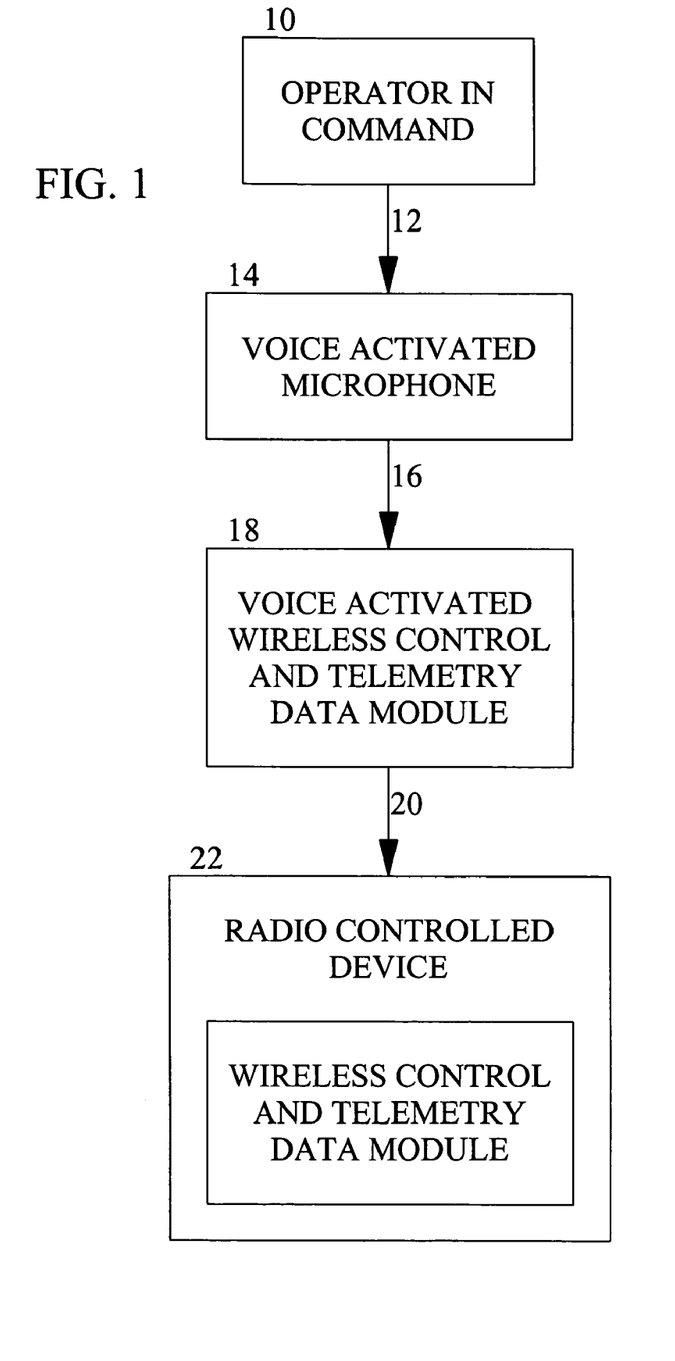
FIG. 1 is a flowchart illustrating a one-way voice activated command and control system and a R/C device.
Figure 6:
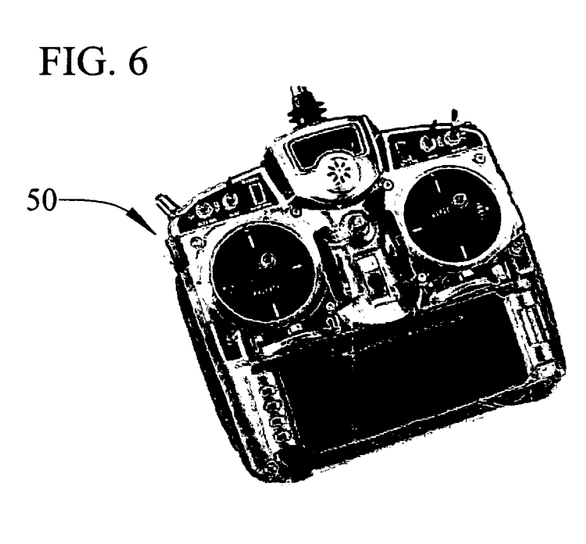
FIG. 6 is a view of a conventional hand-held controller, with the center antenna being substantially cut-off from view.
Figure 7:
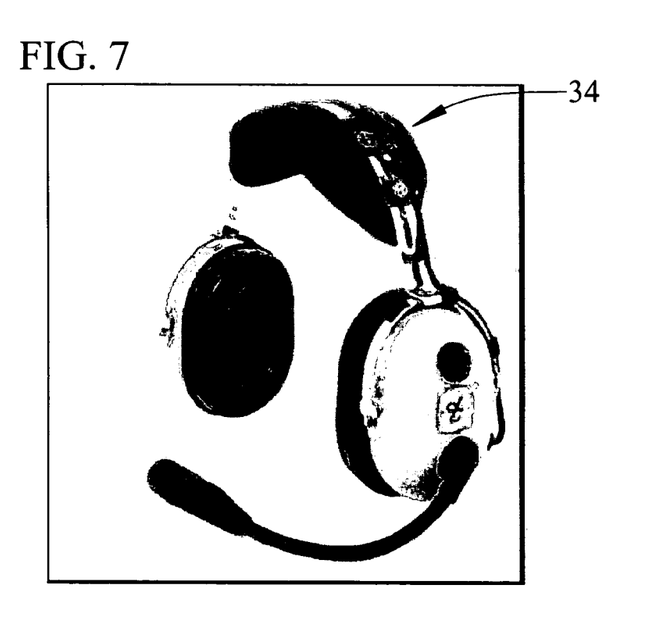
FIG. 7 is a view of a headset for communicating with an R/C device through a two-way voice activated command and control system.
Figure 8:
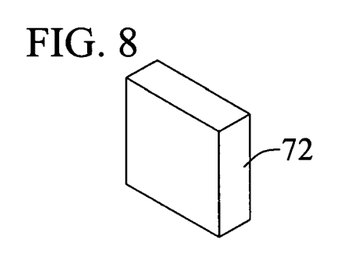
FIG. 8 is a perspective view of a pocket unit for communications with an R/C device.
Figure 9:
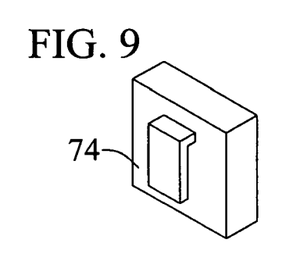
FIG. 9 is a perspective view of a clip-on unit for communications with an R/C device.

One implementation of the invention is represented in the flowchart shown in the drawings in FIG. 1 in a one-way voice activated command and control system as used by an operator 10 with a R/C device 22. The R/C device is a conventional type R/C device, equipped with wireless control and telemetry data module including an on-board radio-wave transmitter/receiver controller, control servos and electronic sensors. The voice activated command and control system includes a voice activated microphone 14, and a voice activated wireless control and telemetry data module 18. To operate the R/C device, the operator 10 speaks a command that is transmitted via sound waves 12. The microphone 14 includes receiver, converter and transmitter modules to receive the sound waves and convert the verbal instruction into a transmitted signal 16 (e.g., electrical, electronic, digital, wireless). The control module 18 includes receiver, converter and transmitter modules to receive and convert the transmitted signal 16 and transmit a wireless (e.g., radio wave) signal 20 to the R/C device. This microphone can be located in a headset 34 such as shown in FIG. 7, in a pocket unit 72 (FIG. 8) or clip-on unit 74 (FIG. 9), or in the hand-held controller 50 such as shown in FIG. 6.

The control module 18 is programmed (or otherwise operable) to recognize an array of converted verbal instructions corresponding to the operational variables of the R/C device, and to transmit associated wireless interactions to the R/C device such that the R/C device responds to the wireless instructions in its normal manner. For example, if the operator speaks the words "flaps thirty" into the microphone, the microphone converts this verbal instruction into an electronic signal. This electronic command signal is sent to the control module which recognizes the command, converts it, and transmits to the R/C device a wireless command signal to cause or result in the flaps moving to their thirty-degree position.

The control module 18 is located in a unit in communication with or integrated with the microphone. In a preferred embodiment, the control module 18 is integrated into a hand-held R/C controller 50 such as an otherwise generally conventional-type configuration with which the operator is familiar (see e.g., FIG. 6). The control module includes a prior programmed microprocessor and will comprise a second control path, in parallel to and/or in series with the conventional control path, in the hand-held controller so that the R/C device can be controlled verbally in accordance with the invention, and/or with conventional levers and switches (see further discussion below). The converted verbal signal is matched by the microprocessor to the applicable command signal which triggers the control action to the flap control interface and generating of the applicable wireless signal which is then transmitted to the on-board receiver on the R/C device via radio waves. The transmitted signal is received by the R/C device and then converted to operate the controlling servo linked to the flaps and the flaps move down to a thirty-degree position.

The voice activated command and control system of the invention is applicable for use with all types of R/C vehicles, each of which will have a hand-held controller similar in function and operation to an aircraft controller (as described above), but of course, with trim and auxiliary controls and switches modified to control operation of the applicable vehicle, with the variable operational parameters particularly applicable to such specific-type vehicles.

For example, other commonly available R/C vehicles include other air vehicles such as sail planes and helicopters, water vehicles such as boats, and land vehicles such as cars and trucks. Examples of the controllable operational variables in such vehicles include:

(a) for sail planes: rudder, elevators and ailerons (collectively aircraft "trim" controls), air brake, flaps and dual-rate controls;

(b) for boats: rudder and throttle (collectively boat "trim" controls), horn, lights, and trim;

(c) for helicopters: cyclic control forward, backward, left, and right, main rotor pitch control, rear rotor pitch control, and throttle (collectively helicopter "trim" controls), standard forward flight, aerobatic flight, exponential, lights and retractable landing gear, smoke; and (d) for cars and trucks: steering and throttle or engine speed (collectively wheeled vehicle "trim" controls), and lights, sounds (e.g., horns, engine, air brakes), smoke, forward and reverse, vibration.

The invention, when modified for the specific-type vehicle, will be applicable to all types of R/C vehicles and devices.

The invention is also applicable, and will be functionally equivalently provided for by persons skilled in the relevant art, for voice-activated command and control for control of virtual (simulated) vehicles as utilized in vehicle control simulators. In this instance, the voice activated command and control system can be configured for selection or control of the operational or environmental parameters of the simulator or simulation software.

Figure 2:
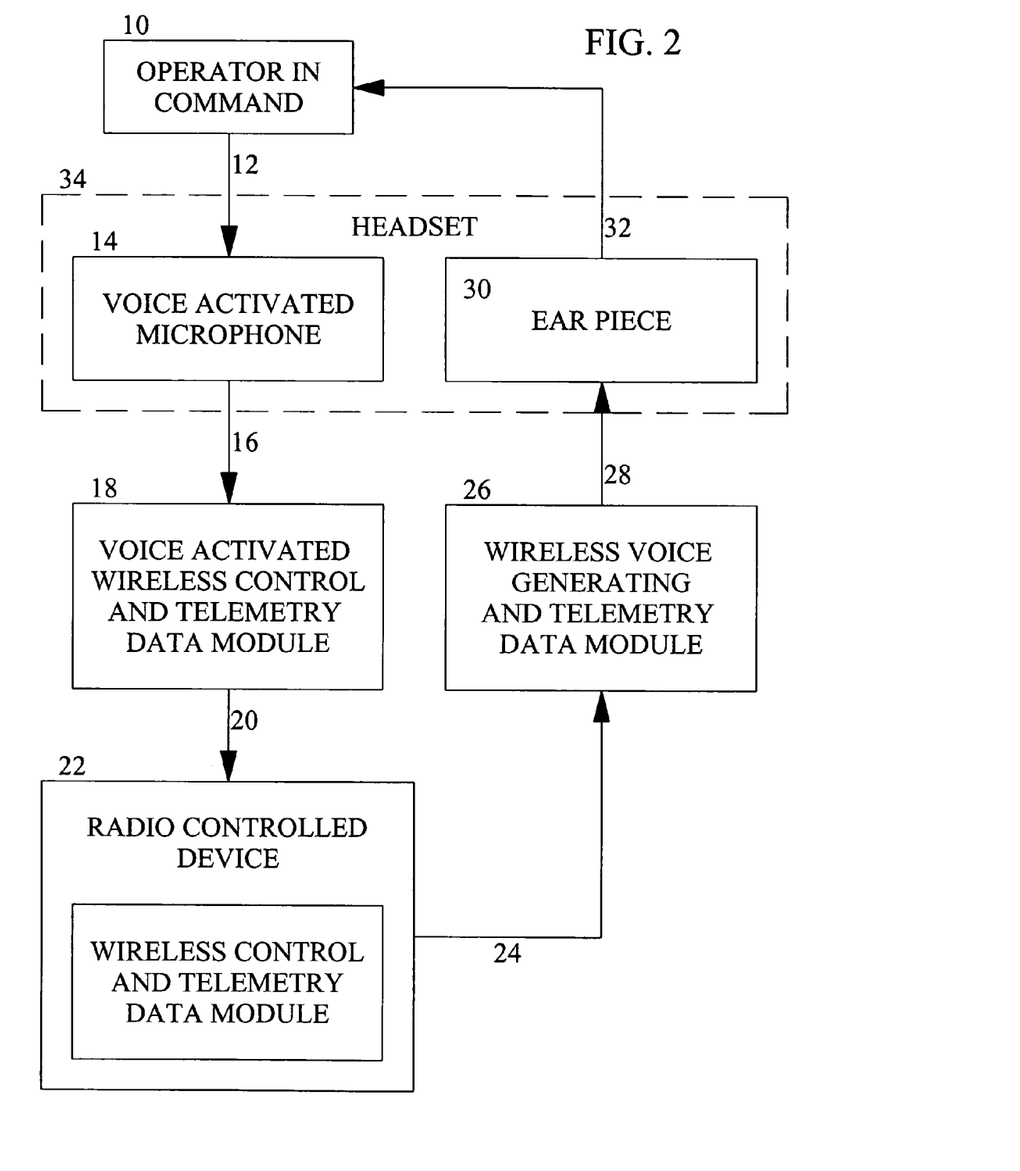
FIG. 2 is a flowchart illustrating a two-way voice activated command and control system and a R/C device, with voice-feedback.

As further illustration, a second implementation of the present invention is represented in the flowchart shown in the drawings in FIG. 2 in a two-way command and control system as used by an operator 10 with a R/C device 22. In this instance, operational control of the device 22 proceeds as described above, but the system includes provision for return data, from the R/C device back to the operator, to provide the operator with audible feedback and confirmation of completion of control commands transmitted to the R/C device. More particularly, the control system further includes a wireless voice generating and telemetry data module 26 and a wireless receiving speaker included in the voice-activated unit with the microphone, such as an ear piece 30 included in an operator's headset 34. The module 26 includes receiver, converter and transmitter modules to receive and convert a signal 24 from the on-board controller 22 of the R/C device confirming receipt and/or completion of a control command and transmit a wireless (e.g., radio wave) signal 28 to the headset or other configured control unit. The headset and/or ear piece includes receiver, converter and transmitter modules to receive the wireless signal 28 and convert it into a spoken or other sound at the ear piece to provide the operator with audible confirmation of receipt and/or execution of the control command. In the case of the system providing confirmation of execution, the R/C device will include appropriate sensors and/or feedback elements, conventional for the parameter to be detected, to provide the on-board controller with a signal confirming completion of the command.

Figure 3:
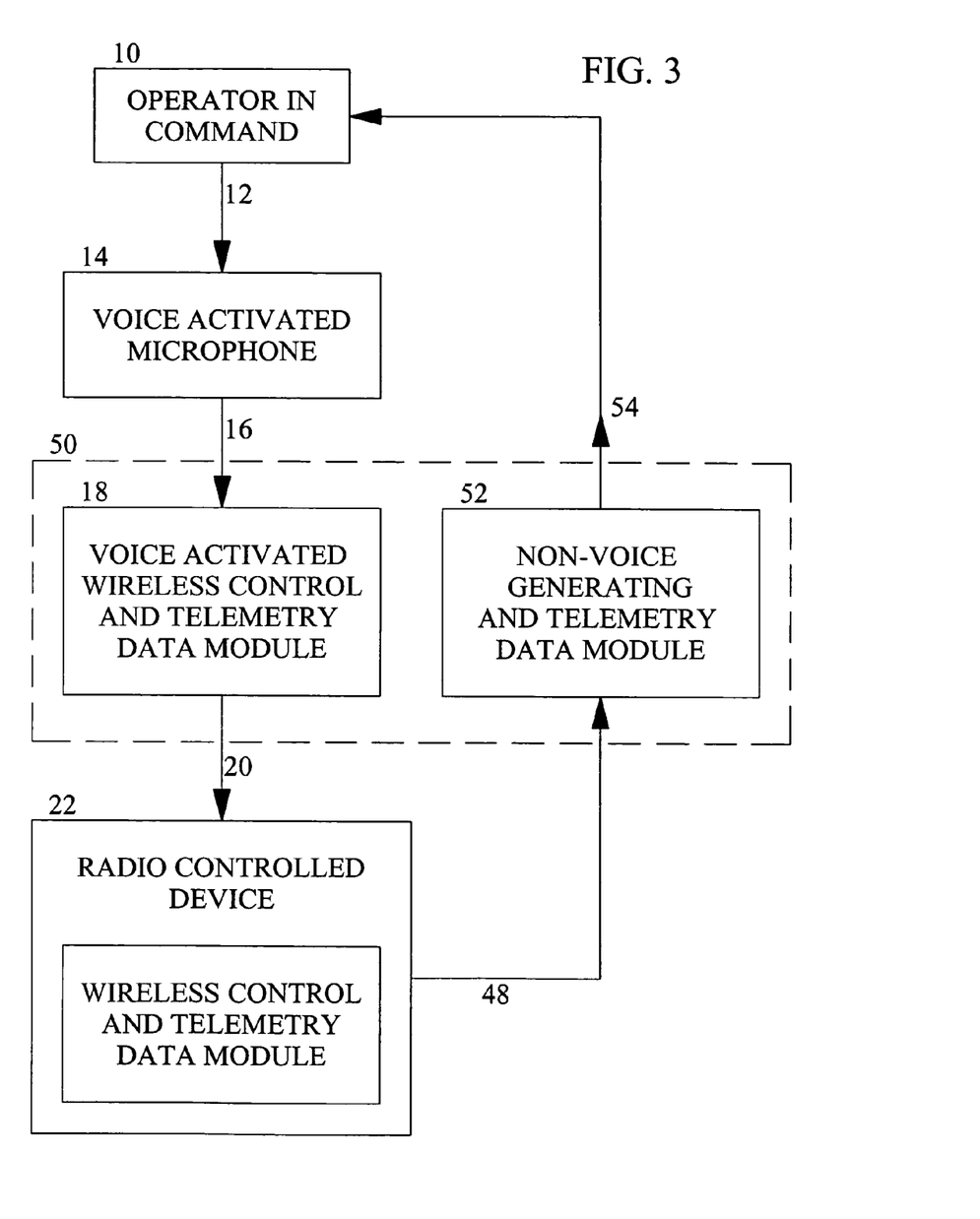
FIG. 3 is a flowchart illustrating an alternate two-way voice activated command and control system and a R/C device, with non-voice-feedback.

A second alternate implementation of the invention represented in the flowchart shown in FIG. 3 is a two-way command and control system as generally described above, except that in this instance the system includes provision for return data, from the R/C device to the operator as audible or visual non-voice feedback and/or confirmation of completion of control commands transmitted to the R/C device. More particularly, the control system is provided with feedback 48 from the R/C device to a non-voice generating data module 52 that generates a non-voice audible or visual feedback indicator 54 to the operator. The data module 52 can be located in the hand-held controller 50 as shown, or it can be located otherwise for the convenience of the operator such as indicated above. This non-voice feedback is provided to the operator responsive to voice-activation by the operator such that the operator controls what feedback he receives and when for timing of the feedback at his convenience. This non-voice feedback can be presented to the operator in any convenient manner such as by illumination of an LED screen, illumination of LED indicators, beeping, etc.

Figure 4:
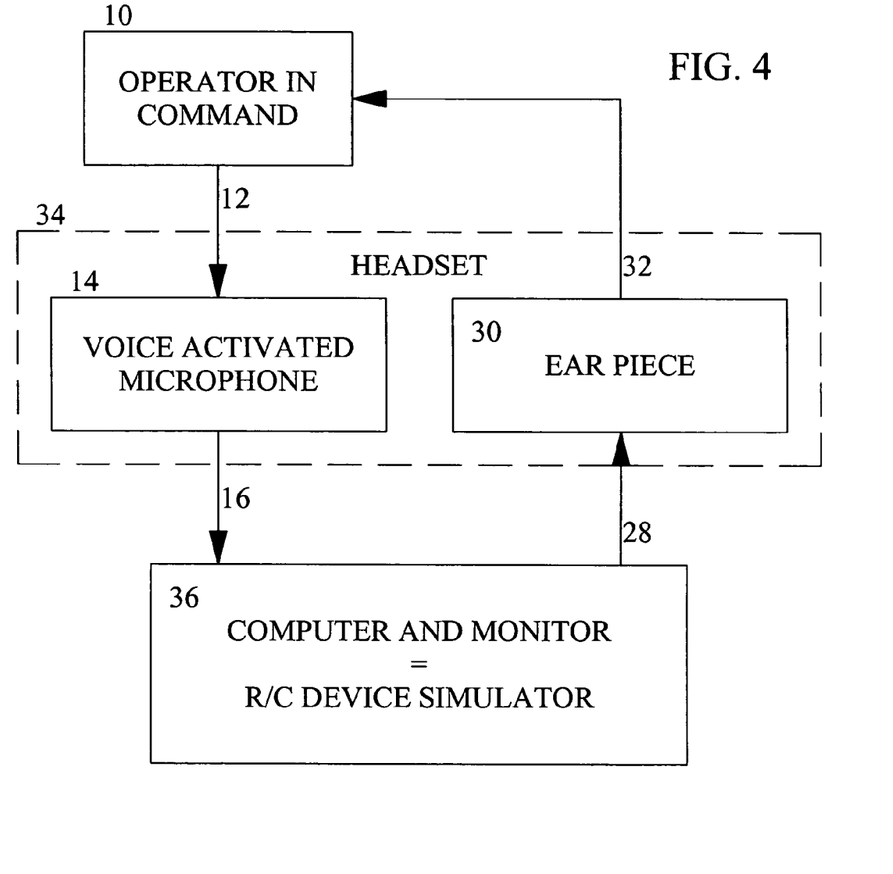
FIG. 4 is a flowchart illustrating a two-way voice activated command and control system and a R/C simulation device.

As illustrated in FIG. 4, the voice activated command and control system of the invention is applicable for use with a simulation program or in a flight simulating device with such a program. In this instance, a computer 36 (or other configured, processor-controlled device) is programmed to simulate the operation and response of the R/C device, and the voice activated command and control system of one of the types discussed herein, including all of the operative modules, for interfacing with the simulated remotely-controlled vehicle and the headset 34.

Figure 5:
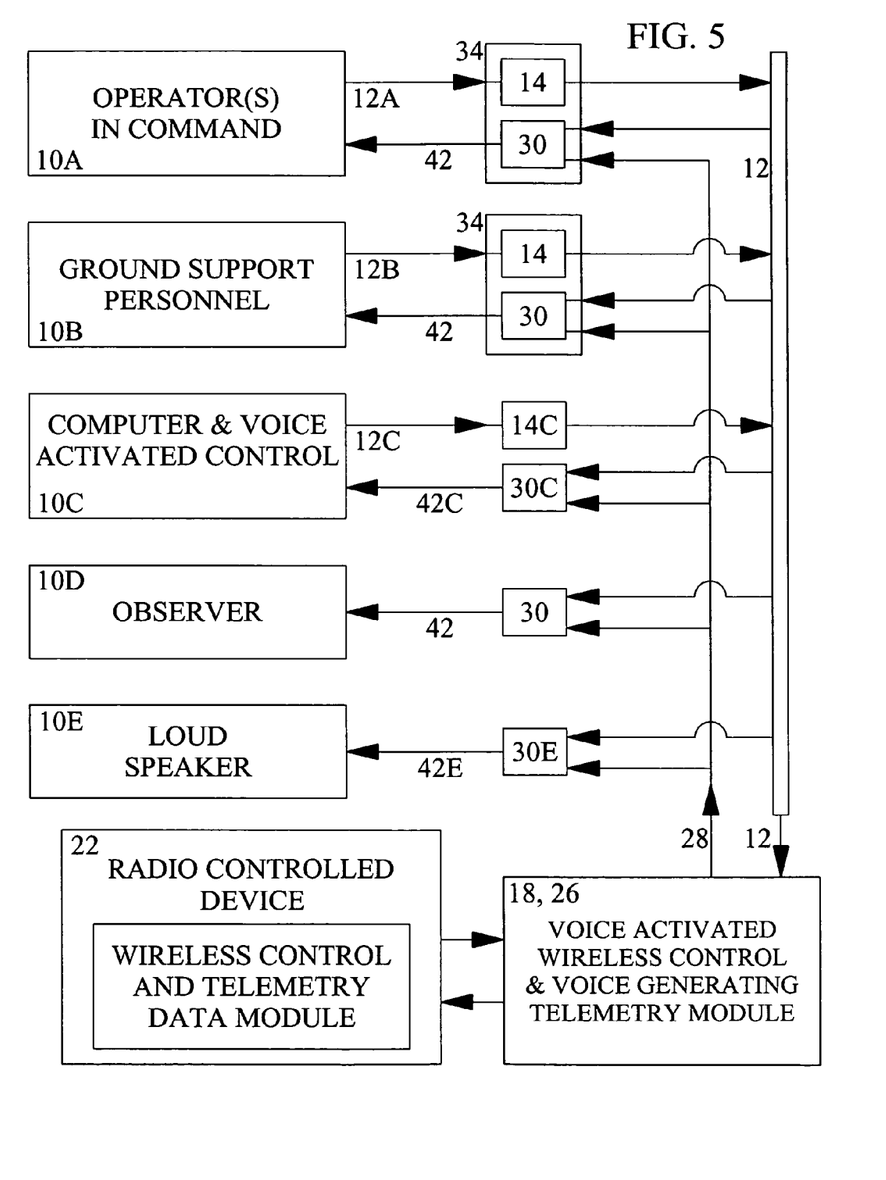
FIG. 5 is a flowchart illustrating a two-way voice activated command and control system with multiple signal transmission and a R/C device.

As illustrated in the flowchart shown in FIG. 5, the voice activated command and control system of the invention, shown as implemented in a two-way system, is also applicable for multiplexing headsets 34, earphones 30 and the like as applicable for use by or in connection with one or more operators 10A, ground support personnel 10B, an observer 10D, a loudspeaker 10E, and/or a computer and voice activated control unit or other microprocessor-based unit 10C at one time. Primary voice-activated command and control is affected by the operator(s) with voice signals 12A converted through microphone(s) 14 that transmit the converted signal to a control signal buss 12 that delivers the control signal to the module 18. A multiplex system of this type may further include provision for optional and/or override voice-activated command and control as desired by the ground support personnel with voice signal 12B that is similarly converted and delivered to the control signal buss 12; and/or by the computer 10C with an electronic signal 12C transmitted through or converted by module 14C for delivery of a compatible signal to the control signal buss 12. This multiplex system will also include provision for all parties in the system to monitor all two-way communications between the control signal buss 12 and the R/C device. As illustrated in FIG. 5, the operator(s) 10A, the ground support personnel 10B, and the observer 10D will receive both signals 12 from the control buss and 28 from the R/C device through ear piece 30 which signals are delivered via combined audible signal 42. The loudspeaker 10E and the computer 10C will also receive both signals 12 from the control buss and 28 from the R/C device but transmitted through compatible modules 30E, 30C for delivery of compatible signals 42E, 42C indicative of the two-way communications with the R/C device.

A voice-activated command and control system in accordance with the invention can be further implemented in either (1) a parallel-type system wherein operation of the voice-activated command control system is independent from operation of manual controls such as provided by a hand-held controller 50, or (2) a series-type system wherein operation of the voice-activated command control system is interdependent with operation of manual controls. To the extent that the voice-activated controls are independent from the conventional manual controls, the R/C device will be provided with a separate, independent on-board system for each the voice-activated controls and the manual controls. It is further noted that of the numerous control parameters of the various R/C devices, only the proportional trim controls, such as controlled by the two joy sticks of the conventional hand-held controller, are typically considered as essential controls aspects, and that in all preferred embodiments of the invention such essential control aspects can at least be optionally controlled by the hand-held controller. To the extent that the controls are implemented in parallel, the conventional controller provides an operational backup should the voice-activated control system experience operational difficulties, such as not recognizing the operator's verbal commands.

Figure 10:
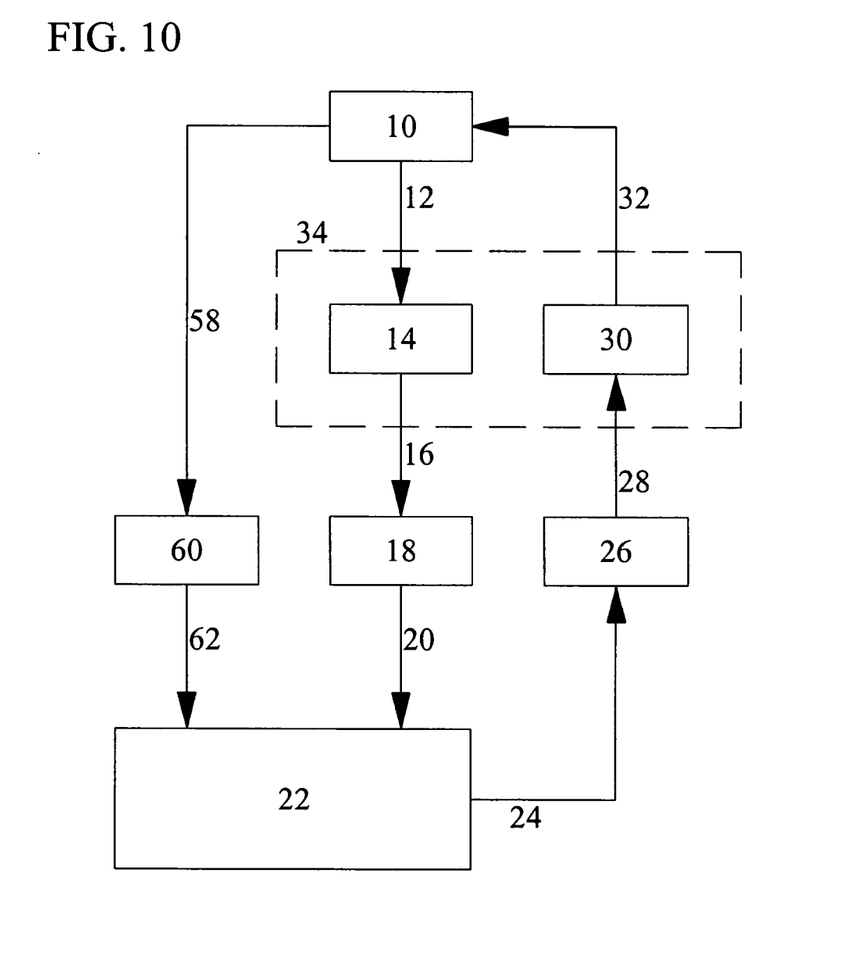
FIG. 10 is a flowchart illustrating parallel independent control of an R/C device by a hand-held controller and a voice-activated command and control system.

A parallel-type system is illustrated in the flowchart in FIG. 10. The operator 10 controls at least a first set of control functions of the R/C device 22 via manual control indicated at 58 through the manually-controlled module 60 of the hand-held controller which delivers signal 62 to the R/C device for control of said first set of control functions. The operator further controls at least a second set of control functions of the R/C device via voice signal 12 as converted and transmitted as described above and delivered via signal 20 to the R/C device for control of said second set of control functions. This second set of control functions may include some or all of the first set of control functions, in which case operation of the overlapping control functions can be operated independently by either manual or voice-activated control. The second set of control functions may alternately not overlap the first set of control functions, in which case both manual and voice-activated control will be required for full control of the R/C vehicle.

Figure 11:
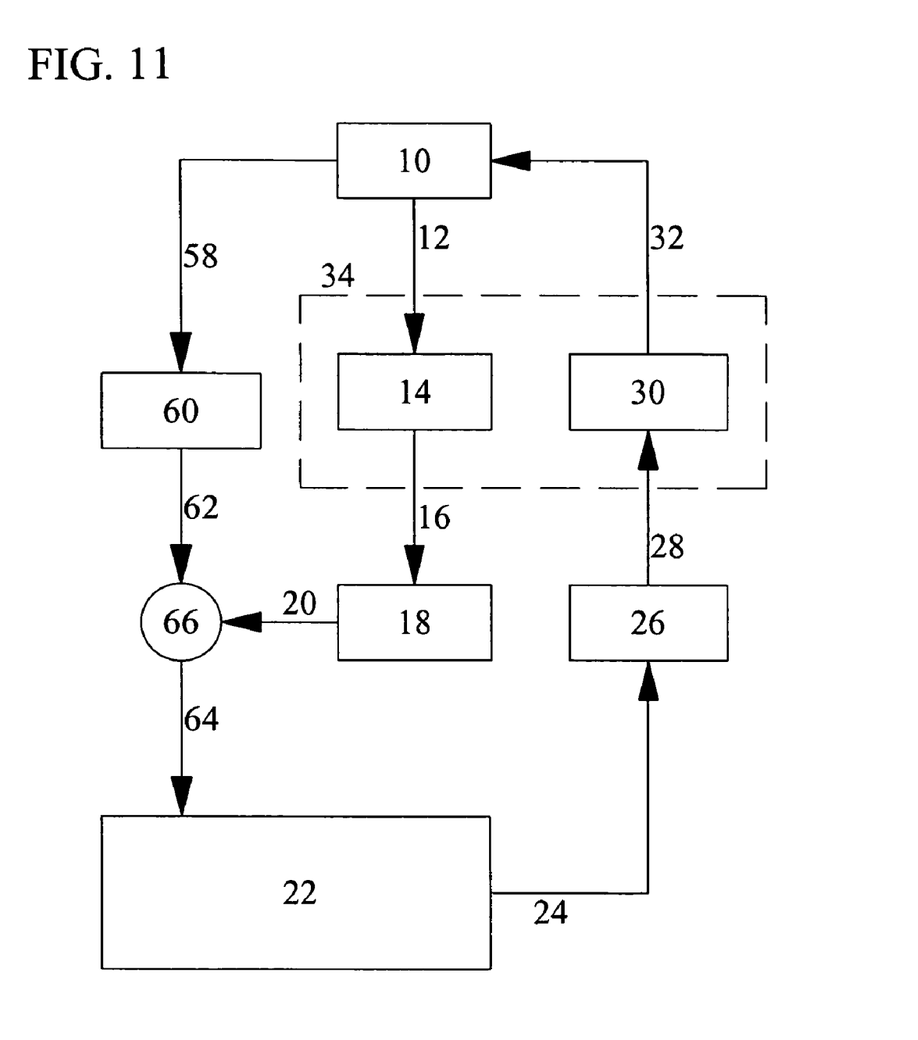
FIG. 11 is a flowchart illustrating series dependent control of an R/C device by a hand-held controller and a voice-activated command and control system.

A cascaded or series-type system is illustrated in the flowchart in FIG. 11. The operator 10 is capable of controlling a first set of control functions of the R/C device 22 via manual control indicated at 58 through the manually-controlled module 60 of the hand-held controller via signal 62. The operator is further capable of controlling a second set of control functions of the R/C device via voice signal 12 as converted and transmitted as described above via signal 20. In this instance, the signals 62 and 20 are delivered to a signal conditioning module 66 that selects the signal(s) 20 and/or 62 to deliver to the R/C vehicle. Thus, if both signals 20 and 62 carry instructions for the same control function of the R/C device, only one signal will be delivered the R/C device (or a combination thereof), which signal will be selected (combined, conditioned, etc.) according to an algorithm pre-established in the module 66 according to the vehicle with which the controller is used including consideration for operational control and safety parameters of the vehicle. In this instance, it is presumed that the first set of control functions applicable to manual control and the second set of control functions applicable to the voice-activated control overlap, and that the selection, combination or conditioning algorithm that is pre-established in the device 66 acts only on such overlapping functions, passing through those signals associated with non-overlapping R/C device control functions. Otherwise, without overlapping control functions, the system illustrated in FIG. 11 will be operatively equivalent to the system illustrated in FIG. 10.

One example of overlapping control functions and a suitable control algorithm, using the voice activated command and control system in controlling an R/C airplane (22) in controlled flight with over lapping control functions, is as follows: While the pilot is controlling the airplane in level flight with the manually actuated joysticks in the hand held transmitter/receiver unit 50; he or she speaks the words "snap roll" into the microphone 14. Snap Roll is a name of an aerobatic flight maneuver performed by the airplane using its control surfaces. These words are matched by the microprocessor to the proper preprogrammed "flight controls sequence program" (in module 66), which will momentarily over ride the manual joy stick controls administered by the pilot's fingers and/or thumbs and run though its control function produced by the microprocessor controlling the airplanes flight control surfaces to cause the airplane to perform a snap roll maneuver. After the microprocessor-generated control function ends the flight control is reverted immediately back to the pilot's manually operated joysticks (via module 66). If for any reason the pilot wants to terminate the preprogrammed "flight controls sequence program" before it's completion he or she speaks the word "stop" into the microphone which immediately reverts the control back to the manual flight control joysticks from the microprocessor and resets the "flight controls sequence program". In a two-way voice activated command and control system the pilot would receive a microprocessor-generated voice feed back in the headset speaker 30. These words could be "copy snap roll" followed by "snap roll complete" or "copy stop" to let the pilot know that the flight control process has been received and completed or function terminated electronically. Of course, many other operational scenarios for overlapping control functions can be implemented within the scope of the invention.

As previously noted, those skilled in the art will readily devise additional alternate embodiments and implementations of the invention in view of the disclosure of the unique arrangement shown in the drawings and discussed above. Such additional alternate embodiments and implementations will include, but not be limited to combinations of various aspects of the specific implementations illustrated in the drawings and discussed above.

I claim:

1. A voice-activated command and control system for a line-of-sight remotely controlled model having trim control functions that are required for stable propulsion and control of the model; the model optionally having auxiliary control functions that are not required for stable propulsion and control of the module; the model having an on-board controller to (a) receive trim control function signals and, if applicable, auxiliary control function signals, by wireless transmission and (b) control the trim control functions and, if applicable, the auxiliary control functions on the model responsive to corresponding trim control function signals and auxiliary control function signals received; the voice-activated command and control system comprising:
  a) a portable microphone for receiving an audible command from an operator; and
  b) a portable voice-activated control module for transmitting a control function signal responsive to the audible command received by the microphone to the model by wireless transmission;
  c) wherein the portable microphone and portable voice-activated control module allow the operator, using his or her voice, to speak a word command into the portable microphone to voice activate and remotely control at least one of said control functions of the model; and
  d) a portable hand-held controller with manually operated trim-function controls corresponding to the trim control functions of the model, the portable hand-held controller transmitting said trim control function signals by wireless transmission to the model responsive to the operator's manual operation of said trim-function controls; whereby stable propulsion and control of the model can be achieved with the portable hand-held controller independently of the voice-activated control module.

2. The voice-activated command and control system as defined in claim 1 in which the portable control module recognizes certain audible commands comprising a first descriptive part and a second numeric or relational part.

3. The voice-activated command and control system as defined in claim 1 further comprising a headset that carries the portable microphone.

4. The voice-activated command and control system as defined in claim 1 in which the portable microphone and the portable control module are located together in a single unit.

5. The voice-activated command and control system as defined in claim 1 wherein portable control module and the portable hand-held controller cooperatively transmitting (a) control function signals responsive to audible commands received by the portable microphone and (b) manual trim control function signals, respectively, to the model by wireless transmission in parallel for a common command set whereby the model is alternatively responsive to the control function signals in said common command set from the audible commands received by the portable microphone and from the manual trim control functions independently of each other.

6. The voice-activated command and control system as defined in claim 1 wherein the portable voice-activated control module and the portable hand-held controller cooperatively transmitting control function signals responsive to audible commands received by the portable microphone and manual trim control function signals, respectively, to the model by wireless transmission in series for a common command set whereby the model is exclusively responsive to individual control function signals in said common command set from either an audible command received by the portable microphone or a manual trim control function.

7. The voice-activated command and control system as defined in claim 1 in which the portable control module (a) communicates with a microprocessor simulated environment for implementing the model, and (b) transmits the control function signals by simulated wireless transmission to the simulated model.

8. The voice-activated command and control system as defined in claim 7 in which the portable control module is further configured to select or control operational or environmental parameters of the simulated environment responsive to additional audible commands spoken to the portable microphone.

9. The voice-activated command and control system as defined in claim 1 in which the portable control module transmits the control function signals by radio waves to the model.

10. A two-way voice-activated command and control system for a line-of-sight remotely controlled model; the model having trim control functions that are required for stable propulsion and control of the module; the model optionally having auxiliary control functions that are not required for stable propulsion and control of the model; the model having an on-board controller to (a) receive trim control function signals and, if applicable, auxiliary control function signals, by wireless transmission, (b) control the trim control function and, if applicable, the auxiliary control functions on the model responsive to corresponding trim control function signals and auxiliary control function signals received, and (c) transmit feedback signals by return wireless transmission indicative of at least one of (i) the control function signals received, (ii) status of the control functions on the model responsive to the corresponding control function signals received, and (iii) model operational or environmental data; the two-way voice-activated command and control system comprising:

a) a portable microphone for receiving an audible command from an operator;
    b) a portable voice-activated control module for transmitting a control function signal responsive to the audible command received by the microphone to the model by wireless transmission;
    c) a portable feedback indicator responsive to feedback signals received by return wireless transmission from the model;
    d) wherein the portable microphone and portable voice-activated control module allow the operator, using his or her voice, to speak a word command into the portable microphone to voice activate and remotely control at least one of said control functions of the model; and
    e) a portable hand-held controller with manually operated trim-functions controls corresponding to the trim control function signals by wireless transmission to the model responsive to the operator's manual operation of the trim-function controls whereby stable propulsion and control of the model can be achieved with the portable hand-held controller independently of the portable voice-activated control module.

11. The two-way voice-activated command and control system as defined in claim 10 in which the portable control module recognizes certain audible commands comprising a first descriptive part and a second numeric or relational part.

12. The two-way voice-activated command and control system as defined in claim 10 in which the portable microphone and portable feedback indicator are located together in a single unit.

13. The two-way voice-activated command and control system as defined in claim 10 in which the portable feedback indicator provides at least one of an audible feedback indicator and a visual feedback indicator responsive to return feedback signals from the model.

14. The two-way voice-activated command and control system as defined in claim 10 in which the portable feedback indicator includes a speaker to produce said audible feedback in the form of spoken communication, and a headset that carries the portable microphone and the speaker in a single unit.

15. The two-way voice-activated command and control system as defined in claim 10 wherein the portable voice-activated control module and the portable hand-held controller cooperatively transmitting (a) control function signals responsive to audible commands received by the portable microphone and (b) manual trim control function signals, respectively, to the model by wireless transmission in parallel for a common command set whereby the vehicle is alternatively responsive to the control function signals in said common command set from the audible commands received by the microphone and from the manual trim control functions independently of each other.

16. The two-way voice-activated command and control system as defined in claim 10 wherein the portable voice-activated control module and the portable hand-held controller cooperatively transmitting (a) control function signals responsive to audible commands received by the portable microphone and (b) manual trim control function signals, respectively, to the model by wireless transmission in series for a common command set whereby the model is exclusively responsive to individual control function signals in said common command set from either an audible command received by the microphone or a manual trim control function.

17. The two-way voice-activated command and control system as defined in claim 10 in which the portable control module (a) communicates with a microprocessor simulated environment for implementing the model, and (b) transmits the control function signals by simulated wireless transmission to the simulated model.

18. The two-way voice-activated command and control system as defined in claim 10 in which the portable control module is further configured to select or control operational or environmental parameters of the simulated environment responsive to additional audible commands spoken to the portable microphone.

19. The two-way voice-activated command and control system as defined in claim 10 in which the portable control module transmits the control function signals by radio waves to the model.

20. The two-way voice-activated command and control system as defined in claim 10 further comprising a second portable feedback indicator connected for multiplexed monitoring of the audible commands and the return feedback signals.

* * * * *